(12) United States Patent
Wettergren

(10) Patent No.: US 6,618,809 B1
(45) Date of Patent: Sep. 9, 2003

(54) METHOD AND SECURITY SYSTEM FOR PROCESSING A SECURITY CRITICAL ACTIVITY

(75) Inventor: Christian Wettergren, Stockholm (SE)

(73) Assignee: Myspace AB, Stockholm (SE)

( * ) Notice: Subject to any disclaimer, the term of this patent is extended or adjusted under 35 U.S.C. 154(b) by 0 days.

(21) Appl. No.: 09/284,567

(22) PCT Filed: Oct. 30, 1999

(86) PCT No.: PCT/SE97/01817
§ 371 (c)(1),
(2), (4) Date: Jun. 9, 1999

(87) PCT Pub. No.: WO98/19243
PCT Pub. Date: May 7, 1998

(30) Foreign Application Priority Data

Oct. 30, 1996 (SE) ............................................. 9603962

(51) Int. Cl.[7] ............................................... G06F 1/24
(52) U.S. Cl. .................... 713/201; 713/200; 713/182
(58) Field of Search ................................. 713/201, 200, 713/182

(56) References Cited

U.S. PATENT DOCUMENTS 5,272,754 A   12/1993   Boerbert
5,355,414 A * 10/1994   Hale et al. ................... 713/202
5,369,707 A * 11/1994   Follendore, III ............ 713/155

FOREIGN PATENT DOCUMENTS

| EP | 0443423 | 8/1991 |
|----|---------|--------|
| EP | 0587375 | 3/1994 |
| GB | 2267986 | 12/1993 |
| WO | 9401821 | 1/1994 |

* cited by examiner

Primary Examiner—Thomas R. Peeso
(74) Attorney, Agent, or Firm—Young & Thompson

(57) ABSTRACT

A method, a security system and a security device for data processing a security critical activity in a secure management mode, the processing method includes the steps of allocating the security device in response to a call from the processor or the input/output devices, when in a normal mode, transferring the control of the data processing to the security device and thereby entering the secure management mode, processing, with user involvement, the security critical activity on the security device, transferring the result of the data processing of the security critical activity to the processor, the input/output devices or within the security device, and transferring the control of the input/output devices and the control of the data processing from the security device to the processor and thereby again entering the normal mode.

20 Claims, 6 Drawing Sheets

METHOD AND SECURITY SYSTEM FOR PROCESSING A SECURITY CRITICAL ACTIVITY

BACKGROUND OF THE INVENTION

1. Field of the Invention

The present invention relates to a method, a security system and a security device for data processing a security critical activity

2. Description of the Prior Art

Advances in computer and communications technology have increased the flow of information between and within computer networks. This ability to communicate between computers and networks has also made it possible to develop a wide variety of services that can be performed from your own personal computer. Such services may for example be mailing, home shopping, home banking etc. Many of these services comprise security critical activities that have to be performed when the computer is on-line, such as transferring money through Internet.

Performing such security critical activities, is of course a security risk, since also potential intruders can listen to and/or compromise these security critical activities, by breaking into the computer. One of the reasons for this is that the operating systems of personal computers were not designed with security in mind, since they were personal and without connections to any network. Thus, it is easy to use malicious code, Trojan horses or the like to compromise the operating system of a personal computer and thereby the security critical activities executed thereon. Also more secure operating systems, such as Unix, may be compromised with a relatively small effort. Today there is no commercial operating system that protects the user from Trojan horses.

To increase the security of the operating system there has been suggested to provide firewalls between the local network and the public available networks open to any intruders. Such firewalls filter the communication between the local network and the outside world by only allowing certain selected services to pass through. If other services are requested the passing through the firewall will only be enabled if a valid password is presented. The communication then eventually reaches either a personal computer or a server computer inside the local network. This safety measure will of course increase the security, but will still not guarantee that the security critical activities are performed the way the user initially intended. Vulnerabilities in the implementation of the allowed, non-filtered, services may allow an intruder to intrude into the personal computer.

Another possible security measurement is to insert security mechanisms in the operating system, like requiring passwords for access to certain services.

The main reason why the above security mechanisms are not totally safe is that they are software based. Since software always contains bugs, it is corruptible, and may therefore be compromised by exploited security holes, malicious code, resident Trojan horse software etc. Software based security solutions are also too brittle, i.e. if the operating system security is compromised all data and all applications that are executed thereon will also be compromised.

Another common security measure is to use so called "active cards", or "smart cards". These cards contain a small computing device having a processor, a memory and communication ports. Such device may include a secret key, which is used to represent the user's identity in the networks. The card is used together with a host system, and the host system can ask the card to perform security critical steps in activities with the secret key. The host system cannot read the secret key, it is trapped inside the smart card. The processor on the smart card cannot communicate directly with the user, it has to rely on the host system to relay the communication with the user without any malicious intervention. Hence, a smart card can do very little to protect itself against malicious software in a host system.

In personal computers using smart cards, a compromised application may get the smart card to perform any action it normally can do, without having to involve the user. The smart card can be ordered, by the application, to sign any digital document, and the user is not required to review it, nor to express any explicit act-of-will for the signature to be applied to the document.

One different, but similar approach to increase the operating system security is to build a so called multi level secure (MLS) operating system. Such systems label objects and subjects according to a security classification, and define rules for how information is allowed to flow through the system. The classification of different security levels and the record keeping of which users that have access to different security levels and objects is very time consuming to maintain. Furthermore, conventional personal computer applications are not compatible with the operating systems of the MLS system, and all applications have to be tailor-made for the MLS system. This is of course very costly.

WO94/01821 discloses a trusted path subsystem for workstations, such as personal computers. The system comprises a network computer, which is a MLS computer and a workstation. The object of the invention is to provide safe communication between a trusted subsystem of the MLS computer and the workstation. To solve this problem the workstation is connected to a trusted path subsystem which receives the encrypted data from the trusted system of the MLS computer and decrypts it without involving the workstation.

Thus, the application running on the MLS-system will be certain that the data received will be the same as the data sent from the trusted subsystem of the MLS computer, and vice versa. However, this system is limited to the secure exchange of data between a trusted subsystem of a MLS computer and a network computer, basically tunnelling encrypted keystrokes and pixel writes from the application in the MLS-system to the trusted subsystem in the workstation.

Furthermore, the whole application is executing in a highly secure environment, the MLS system. A lot of effort has been made to make sure that the whole application is secure. However, if the application is compromised, for example by security holes in the application itself, or if the system administrator attacks the application, the trusted subsystem will not guarantee that the application presents the same information on the "secured" screen as is later signed, since it lacks means for user involvement. Thus, there are no requirements for the application to get an act-of-will from the user in order to sign a digital document.

UK patent application GB 2 267 986 discloses a security device for a computer. The object of this security device is to isolate the computer from the input/output devices, such as keyboard and mouse, when security critical activities are to be performed. The security device comprises a processor storing a plurality of programs for operating the security device in either a transparent mode or a special handling mode. In the transparent mode the data inputted from the input/output devices is transmitted through the security device directly to the computer, i.e. the security device is in a passive mode. In the special handling mode the security device itself will perform the processing of the data by executing one of the stored programs without any involvement of the computer.

When the processor of the security device receives a command, that is associated with any of the plurality of programs stored therein, it will start the special handling mode and execute one of the programs The different programs stored in the processor of the security device all define different security critical activities. The program may also in some cases require a password or the like before the security critical activity is executed. As soon as such password is received the program will execute the rest of the security critical activity automatically. New programs to be stored in the security device can be loaded from the computer, without any user involvement in the loading process. Hence, the user can not be certain which steps are performed within the security device after loading a new program. Thus, the application itself may be compromised and since signing a block of data does not require any review or act-of-will from the user it is possible that activities are performed that the user did not initially intend.

Even if this system provides a high degree of security it still has a major drawback, namely it lacks user involvement.

SUMMARY OF THE INVENTION

User involvement is an essential part in executing security critical activities if, for example, the task of these activities is to create a legally binding document. In the case where a document is to be signed traditionally, i.e. on paper, it is required that the person signing the paper, firstly can be identified by his signature, secondly reads through and verifies the content of the paper and then thirdly puts his signature on the paper as an act-of-will. Thus, digital signature systems have to be designed to allow the user to perform the same steps when signing a digital document, if it is to be legally binding.

Surprisingly the inventor found that the methods used today for performing security critical activities, as described above, in contrast to this are system-orientated, i.e. the system is expected to perform the security critical activities and only consult the user occasionally with less important tasks.

With system approach is meant that the system or application is able to do whatever the user can do. Thus, such a system is capable to simulate the user. In a system with user approach the user has to be involved in order to perform certain steps, i.e. such steps can not be simulated by the system or application.

Thus, the objective problem to be solved by the present invention is to provide a method, a system and a device for processing security critical activities which is user-orientated and firmly involves the user in performing the security critical activities.

This problem is solved by a method, a system and a device as defined in claims 1, 10 and 15, respectively.

Preferred embodiments of the invention are defined in the dependent claims 2–9, 11–14 and 16.

By using the method according to the present invention the user will be firmly involved every time a security critical activity is to be performed, i.e. the method is user based in contrast to the system based methods in prior art. This approach according to the invention will always guarantee that the user has control over the security critical activity that is being executed on the security system, since an act-of-will of the user is required in order to perform such activities. Furthermore, the method according to the invention provides a secure space in which the security critical activities are processed.

Thus with the method according to the invention it is possible to perform tasks such as signing legally binding documents, sending secret mails, performing payments, loading cash-cards, making secret phone calls etc. in a reliable and secure way by making use of the user involvement steps.

By providing the security system according to the present invention with switching and crypto devices it is possible to encrypt the data from and to the input/output devices and thereby use the already existing lines of the computer to tunnel data to the security device. Thus, the security system can be designed with a minimum of changes to the ordinary computer. The only additional equipment that is needed is, the security device, its connection lines and the switching and crypto devices. Thus, the security system according to the present invention does not need an additional screen in order to create an secure space in which security critical activities can be performed.

BRIEF DESCRIPTION OF THE DRAWINGS

The foregoing and other aspects of the present invention will be best appreciated with reference to the following detailed description of a specific embodiment of the invention, given by way of example only, when read in conjunction with the accompanying drawings, wherein.

DESCRIPTION OF THE PREFERRED EMBODIMENTS

Figure 1:
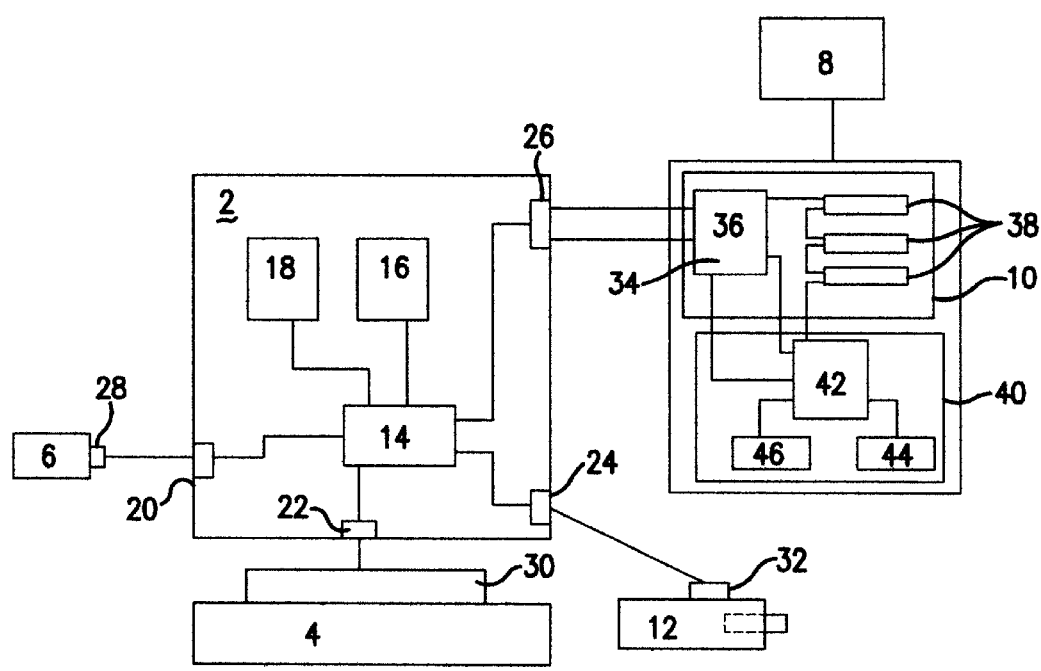
FIG. 1 shows a block diagram of the security system according to the present invention.

FIG. 1 shows a security system according to one embodiment of the invention. Such a system is used to perform security critical activities when the system is connected to a public network and comprises an arbitrary personal computer 2, input/output devices such as a keyboard 4, a mouse 6, a display 8, and a smart card reader/writer (r/w) 12. It shall be understood that the number and type of input/output devices used by the security system according to the invention may vary depending on what kind of security critical activities are to be performed. Thus, it is no always necessary to use the mouse or the smart card r/w and in some cases it might be desirable to use other input/output devices such as speakers, microphones or the like. Furthermore, the personal computer 2 may be substituted by a terminal or the like without departing from the scope of the invention. Thus, when making reference to the processor of the computer 2, this also includes a processor to which a terminal is connected, i.e. the computer/terminal and the processor running the application do not necessarily have to have the same physical location.

The personal computer 2 is provided with a processor 14, a read only memory (ROM) 16 and a random access memory (RAM) 18. Each physical input/output device 4, 6, 8, 12 is connected to the computer 2 through a suitable communication interface 20, 22, 24, 26, which is well known to a person skilled in the art. As can be seen in FIG. 1, the display 8 is connected to the computer 2 via a screen device controller 10. Each input/output device 4, 6, 8, 12 is also provided with a switching and crypto device 28, 30, 32, 34, the function of which is to be described below. It shall be understood that also the input/output devices 4, 6, 12 have device controllers, which in the shown embodiment are incorporated in the switching and crypto devices 28, 30, 32.

The screen device controller 10 comprises a screen control circuit 36 and a screen memory 38. In this embodiment of the present invention the screen controller 10 is connected to a security device 40, comprising a processor 42, a PROM 44 and a RAM 46. The processor 42 of the security device 40 is connected to the screen circuit 36 and to the screen memory 38 and also to the PROM 44 and the RAM 46. The processor 42 is also connected to and controls the switching and crypto device 34 provided in the screen circuit 36. In this embodiment the switching and crypto device 34 serves as blocking means, i.e. prevents the processor 14 of the computer 14 from getting access to the screen device controller 10.

Figure 2:
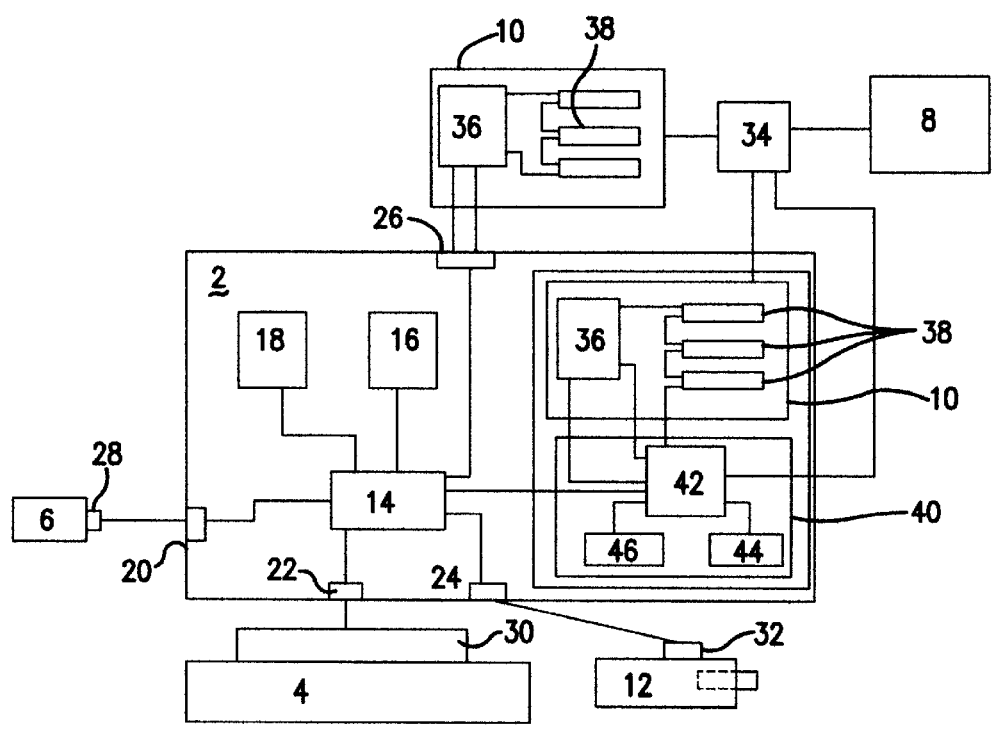
FIG. 2 shows a block diagram of the security system according to a second embodiment of the invention.

However, it shall be understood that the security device 40 may also be provided in the computer 2 or in a separate space as long as the security device 40 is capable, without involvement of the processor 14, of controlling the switching and crypto devices 28, 30, 32, 34, i.e. the processor 14 shall not at any time be capable of taking over control of the switching and crypto devices 28, 30, 32, 34, which is to be described below. FIG. 2, shows an alternative embodiment of the security system, in which the security device 40 is incorporated within the computer 2. In this embodiment of the invention the screen device controller 10 is duplicated and the switching and crypto device 34 is acting as an ordinary switch, which is controlled by the security device 40, in order to switch between the two screen control devices 10.

As mentioned above the security system is used to perform security critical activities when the security system, i.e. the computer 2, is connected and on-line with a network. If the computer is a stand-alone computer there is no need for a security device 40, since no intruder is able to listen or compromise with the processed data. Thus, the present invention is directed towards computers that are on-line with networks. Security critical activities are activities that the user wishes to perform in privacy, i.e. without the danger of having an intruder listening to or compromising the security critical activity. Examples of such security critical activities are transferring money, signing documents, preparing confidential mails and the like The security systems having the configuration as described above are operable in two different modes. In a first mode, defined as the normal mode, the security system operates as an ordinary computer, that is the security device 40 is in a passive mode. How a computer connected to a public network operates is well known to the person skilled in the art and is therefore not further described. In a second mode, defined as the secure management mode, the security device 40 takes over the control of the data processing in order to, in a reliable way, perform different security critical activities.

Figure 3:
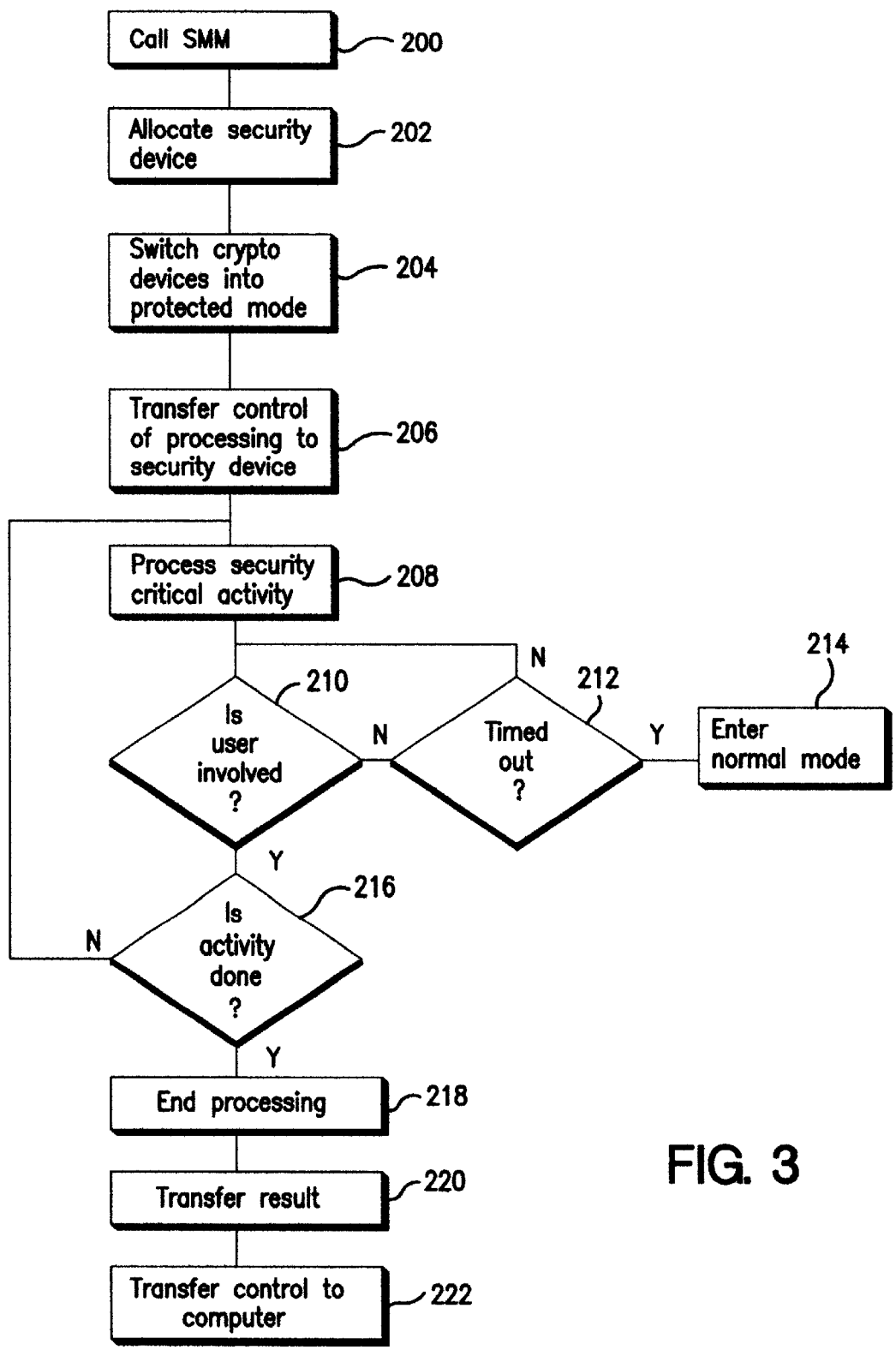
FIG. 3 shows a flow chart of the general method according to the invention.

With reference to FIG. 3, the operation of the security system in the secure management mode (SMM) will now be described in detail. In response to a call at step 200, when the security system is operating in the normal mode, from the processor 14 or any of the input/output devices, i.e the keyboard 4, the mouse 6, the display 8 or the smart card r/w 12 the security device 40 will be allocated at step 202. The security device 40 then switches those of the switching and crypto device 28, 30, 32, 34 associated with the input/output devices 4, 6, 8, 12 to be used during the secure management mode into a protected mode at step 204. In order to perform the switching function the security device 40 is provided with means for generating signals to the switching and crypto devices 28, 30, 32, 34. These means are preferably the processor 42 and program steps stored in the PROM 42. When the requested ones of the switching and crypto devices 28, 30, 32, 34 are switched into the protected mode the security device 40 is in control of the requested ones of the input/output devices 4, 6, 8, 12 and the processor 14 of the computer 2 is no longer capable of receiving any unprotected data therefrom or sending any data thereto.

In the protected mode the switching and crypto devices 28, 30, 32, 34 will encrypt all data that is transmitted from the input/output devices 4, 6, 8, 12. The security device 40 is at all times the only device that can control the entering and leaving of the protected mode. Unencrypted requests to the switching and crypto devices 28, 30, 34, 36 will not be executed, unless it is a request for a non-critical activity. Depending on which input/output device 4, 6, 8, 12 the switching and crypto devices 28, 30, 32, 34 are associated with they can be provided with special functions. These function will only be available from the security device 40 and not from the processor 14, even if the switching and crypto devices 28, 30, 32, 34 are in normal mode. The switching and crypto device 32 associated with the smart card r/w 12 has such a function and allows only certain non-critical security requests to be passed through to the smart card r/w 12. If this precautionary measure is not provided there will be a chance of manipulating the smart card r/w 12 during normal mode in order to circumvent the security device 40 in the secure management mode.

As mentioned above, the processor 42 of the security device 40 shown in FIG. 1, has direct access to the screen device controller 10 and therefore the switching and crypto device 34 only needs to perform a blocking function and not encrypting. In the embodiment shown in FIG. 2, the switching and crypto device 34 has the function of an ordinary switch.

By encrypting the data from and to the input/output devices 4, 6, 8, 12 it is possible to use the already existing lines of the computer 2 to tunnel data to the security device 40. Thus, the security system can be designed with a minimum of changes to the ordinary computer. The only additional equipment that is needed is the security device 40, its connection lines and the switching and crypto devices 28, 30, 32, 34. As mentioned above the security device 40 may be connected to or within the computer system in a number of ways, as shown in FIG. 2 or for example by providing separate physical lines between the security device 40 and the input/output devices 4, 6, 8, 12. However, the embodiment shown in FIG. 1 is preferred since the security device 40 in this embodiment has direct control over the screen memory 38 and the screen control circuit 36, which otherwise have to be duplicated When the switching and crypto devices 28, 30, 32, 34 are not in the protected mode they act as an ordinary connection of an input/output device to a computer.

After taking over the control of the requested input/output devices 4, 6, 6, 12 the security device 40 also takes control over all the data processing to be performed in the secure management mode at step 206. By operating the security system this way, i.e. transferring the control of the data processing of an application running on the processor 14 and the control of the input/output devices 4, 6, 8, 12 to the security device 40, a secure space is created in which the security critical activities can be executed. Then, at step 208, the security device 40 will start to process the security critical activities.

During the processing of the security critical activities the security device 40 will involve the user, i.e. the execution steps performing the security critical activities, which are stored in the PROM 44 of the security device 40, are not performed automatically. Therefore, at step 210 the security device 40 will check if the user has been involved. If the answer at step 210 is NO the security device 40 will check the time period during which the user has not been involved at step 212. If the user is not involved within a certain time limit after a processing step has been performed the security device 40 is timed out and the normal mode is entered at step 214. If the time limit has not yet lapsed the user involvement will again be checked at step 210.

If the answer at step 210 is YES a check will be made if the security critical activity is done at step 216. If the answer at step 216 is NO the processing step 208 and the user involvement step 210 will be repeated as often as necessary. Thus, the security device 40 according to the present invention is provided with means for user involvement. The means for user involvement is the essence of the present invention. This approach to security is completely different compared to the system orientated approaches used in prior art such as GB 2 267 986. The user involvement step will be described further in detail below.

When the processing of the security critical activities have been performed at step 208 and 210 by the security device 40 and the user, the processing will be ended at step 218 and the result thereof will be transferred, at step 220, to the processor 14 of the computer 2, to an output device 12, or remain in the security device 40, for later use.

The transfer of the result is the last step in the secure management mode of the security system. The security device 40 will thereafter, at step 222, transfer the control of the input/output devices 4, 6, 8, 12, the switching and crypto devices/device controllers 28, 30, 32, 34 and the control of the data processing from the security device 40 to the computer 2 by switching the switching and crypto devices 28, 30, 32, 34 into normal mode. This switching from the protected mode to the normal mode is, as mentioned above, only possible to perform from the security device 40, and not from the processor 14.

In order to further increase user involvement the switching and crypto devices 28, 30, 32, 34 may be switched manual and not by the security device 40. In this case the security device 40 must be able to reliably and securely determine the status of the switching and crypto devices 28, 30, 32, 34, in order to be able to decide whether the security critical activity can commence, or whether it has to be interrupted.

The security device 40 may furthermore be provided with an indicator, not shown in the figures, that indicates when the security device 40 is in control and the system is operating in the secure management mode. Such an indicator will make the user aware of when he is able to perform security critical activities.

Thus, the security system and the general method for processing a security critical activity has been described. As mentioned above the essence of the present invention is user involvement and in order to fully understand the invention different examples of steps for carrying out user involvement will now be described. These steps are all part of a security critical activity and the interaction with the user will always be carried out with the switching and crypto devices 28, 30, 32, 34 in the protected mode. Depending on the task to be performed by the security critical activity different combinations of the steps may be used mixed together with steps performed by the security device 40, It shall be understood that if different user involvement steps are combined the dialogue with the user from several steps may be joined into one interaction Thus, even if the examples described below all are part of a security critical activity it shall be understood that they do not have to be a part in every or in the same security critical activity.

Figure 4:
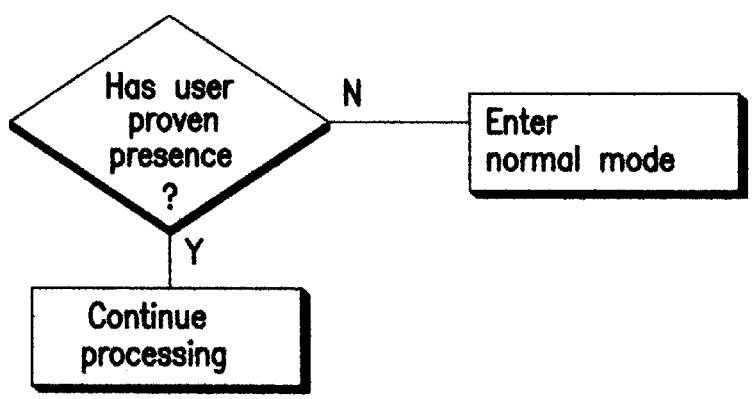
FIG. 4 shows a flow chart of a security step that proves the user presence.

One step in the security critical activity that recurs often is to prove the presence of the user. This step is schematically shown in FIG. 4 and may be performed by letting the user present the identity token, for example through the smart card r/w 12, or by letting the user enter a password. Also biometry such as voice recognition or fingerprints may be used to identify the presence of the user. If the user is not present further data processing in the secure management mode will be interrupted and the normal mode will be entered, else the processing of the security critical activity will continue. It shall be understood that the security device 40 may contain stored information about different users. This will allow different users to make use of the same security system.

Figure 5:
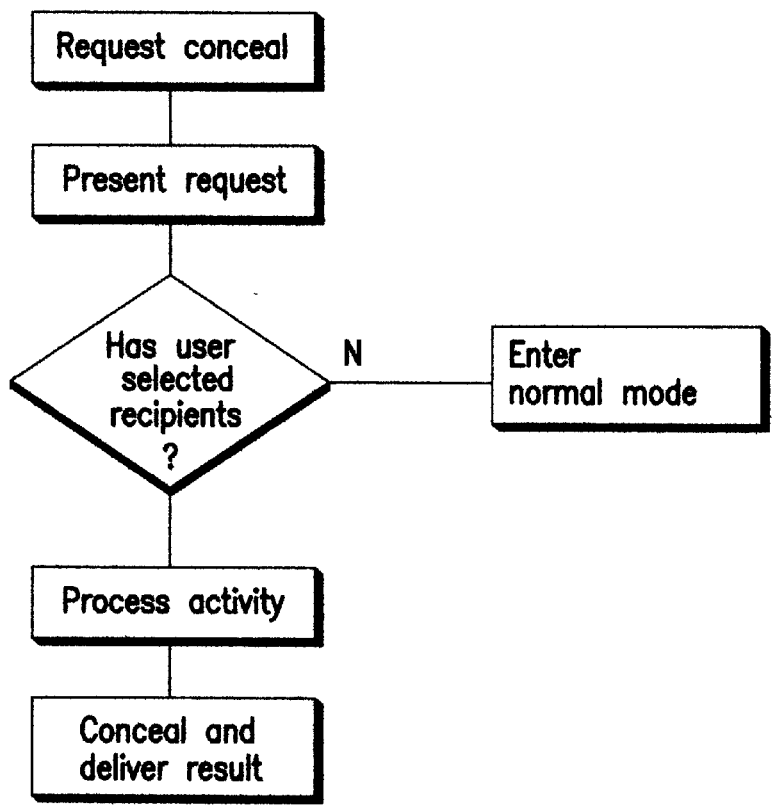
FIG. 5 shows a flow chart of a security step that conceals data.

Another step that can be performed by the security critical activity is to conceal data. This step is schematically shown in FIG. 5. In this step the user first requests that the security critical activity shall be performed with concealed result by using the keyboard 4 or the mouse 6. The request is then presented to the user on the screen 8 or in speakers. The user then has to choose recipients of the concealed result by using the keyboard 4 or mouse 6. Then the reminder of the security critical activity is executed and the results are concealed with the selected recipients.

Figure 6:
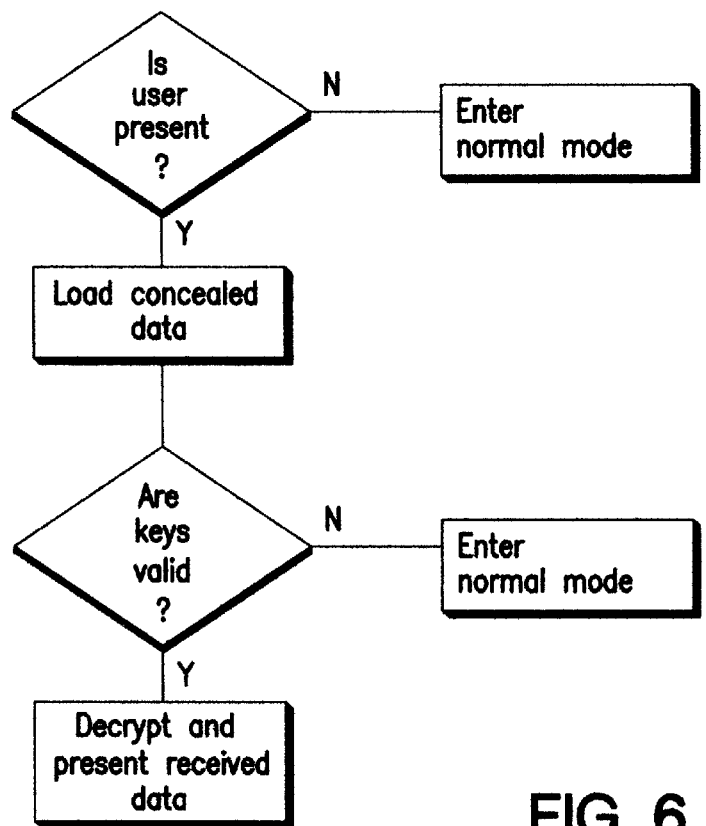
FIG. 6 shows a flow chart of a security step that reveals data.

Yet another step, shown schematically in FIG. 6, that can be a part of the security critical activity is to reveal data to the user. When concealed data is received by the computer 2, the secure management mode will be entered, either by request of the user or automatically if the concealed data contains a command to call and allocate the security device 40. Before the received concealed data is loaded into the security device 40 the user has to prove his presence in order to secure that only permitted data is loaded into the security device 40. Thereafter, if the identity of the user is correct, he has to enter identities and keys, preferably by using the smart card r/w 12. If they are valid the security device 40 will start processing and decrypt the concealed data and present the received data on a suitable output device, such as the screen 8 or speakers If the identities and keys are not valid the normal mode will be entered. It shall be understood that the order in which the presence is proved and the identities and keys are entered may be reversed without changing the outcome of this step.

Figure 7:
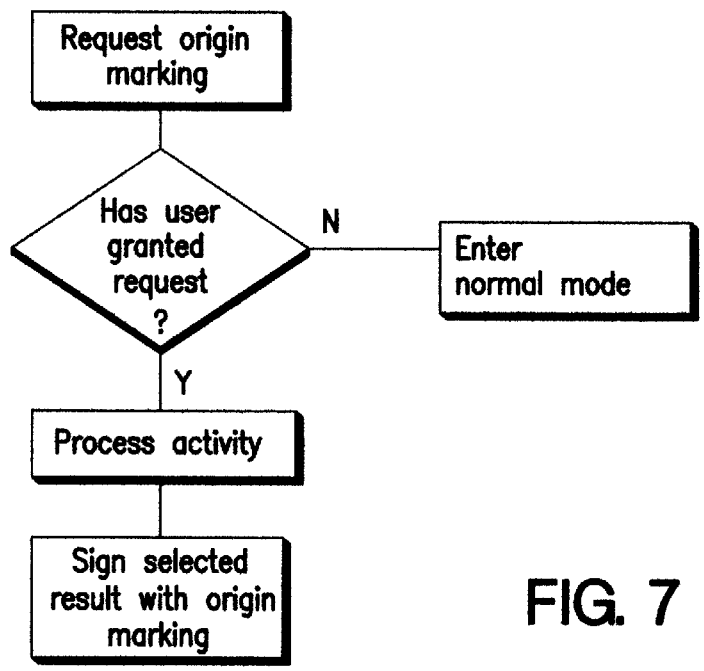
FIG. 7 shows a flow chart of a security step that marks the origin of an activity.
Figure 8:
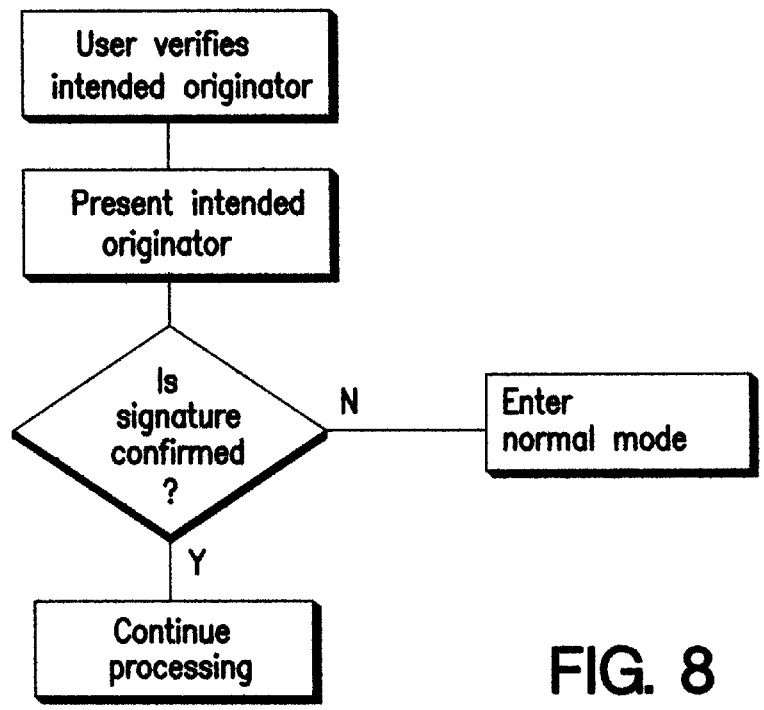
FIG. 8 shows a flow chart of a security step that verifies the origin marking from an intended originator.

A further step of a security critical activity concerns the generation and verification of an origin marking, schematically shown in FIGS. 7 and 8. The generation of the origin marking starts with an user request for an activity with origin marking, through for example the keyboard 4 or the mouse 6. The request is then presented to the user on the screen 8 or on another output device and if the request is correct the user grants the activity. If the request is not granted the normal mode will be entered, but if granted the activity will be executed and selected results thereof are digitally signed for origin marking. Depending on the activity performed the user may interact during this process.

To verify the origin marking the user first has to determine and lock-in at least one intended originator by using an input device such as the keyboard 4 or mouse 6. The at least one intended originator is then presented to the user on the display 8 or the like and when the signed results are received each signature is checked to confirm the at least one intended originator. If the signature is valid the processing in the secure management mode will continue, else the normal mode will be entered.

Figure 9:
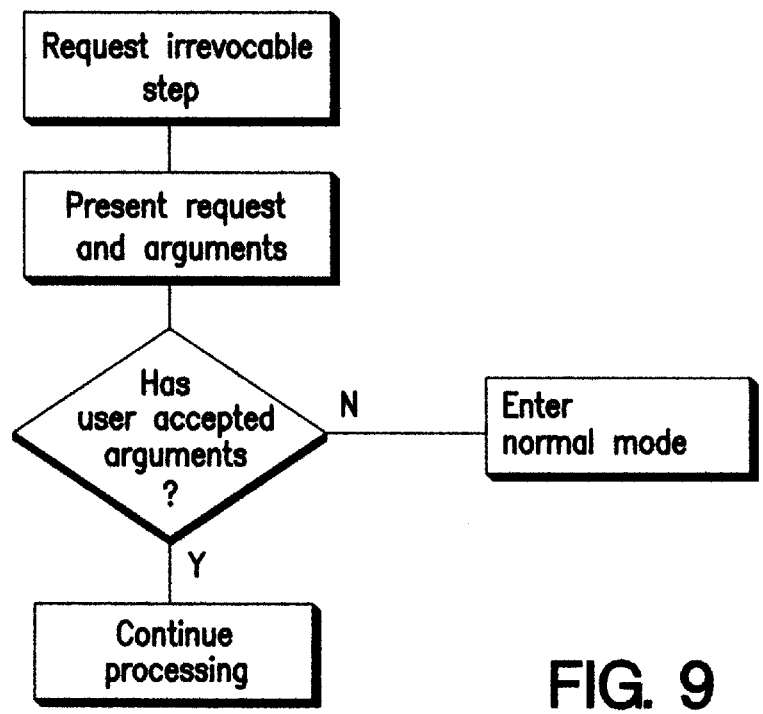
FIG. 9 shows a flow chart of a security step that performs an irrevocable step.

An important step in a security critical activity is to permit the generation of an irrevocable step such as signing a document. In this case, schematically shown in FIG. 9, first a request to perform such a step has to be made. This request together with the arguments of this step are presented to the user on the screen 8 or the like and then the user has the option to alter or enter new arguments. Thereafter the user has to accept or refuse the request. In this way a firm user involvement is always guaranteed before an irrevocable step is performed. When the user has made his accept the processing continues. If the user has not made his accept within a pre-set time limit the normal mode will be entered.

Thus, a number of steps with user involvement have been described. However, it shall be understood that there are numerous of other steps and combinations thereof that fall within the scope of the invention. For example, many of the above steps describe that the user has to enter data in order to secure that the user is firmly involved, but is shall be understood that this data instead may be presented to the user as an option and that the user then with an act-of-will has to confirm that this data is correct. The essence of the invention is that there is provided means for user involvement, i.e. in the above described embodiment a security device 40 having a processor 42 and a PROM 44 in which the above mentioned user involvement steps are stored.

On a higher level the above described user involvement steps concern tasks such as signing legally binding documents, sending secret mails, performing payments, loading cash-cards, making secret phone calls etc. It is believed that there are numerous other high level tasks that can be performed in a secure way by using the user involvement steps above, and in particular also such tasks that will emerge as technology advances.

When signing legally binding documents or performing payments, the following of the above user involvement steps are required; prove user presence and permit generation. To further increase the security also the steps of origin marking and conceal may be incorporated.

Sending secret mails would involve the steps of conceal and optionally also origin marking.

Load a cash-card would involve the steps of permit generation and origin marking which would correspond to making a request to load the cash-card. When the request is granted the loading of the cash-card would involve the steps of revealing the result and verifying origin marking.

Performing a secret phone call would require the steps of conceal, reveal, origin marking and verify origin marking to be involved continuously during the secret phone call.

Whilst this invention has been described in terms of preferred embodiments thereof, it will be appreciated that other forms could readily be adapted by one skilled in the art. Accordingly, the scope of this invention is to be considered limited only by the following claims.

What is claimed is:

1. Method for data processing a security critical activity in a secure management mode, the security critical activity being part of an application running on a system comprising a processor (14), input/output devices (4, 6, 8, 12) and a security device (40), said processing method comprising the following steps:

allocating the security device (40) in response to a call from the processor (14) or any of the input/output devices (4, 6, 8, 12), when in a normal mode, transferring the control of the data processing of the application and the control of requested input/output devices (4, 6, 8, 12) from the processor (14) to the security device (40) and thereby entering the secure management mode, in which mode the processor (14) is incapable of accessing any of the requested input/output devices (4, 6, 8, 12), processing, with user involvement, the security critical activity on the security device (40), the user involvement comprising the step of an act-of-will of the user by means of a user input to the security device proving user presence while the secure management mode prevails, transferring the result of the data processing of the security critical activity to the processor (14), the input/output devices (4, 6, 8, 12) or within the security device (40), and transferring the control of the input/output devices (4, 6, 8, 12) and the control of the data processing from the security device (40) to the processor (14) and thereby entering the normal mode.

2. Method according to claim 1, wherein the step of transferring the control of the requested input/output devices (4, 6, 8, 12) further comprises the step of switching each requested input/output device into a protected mode.

3. Method according to claim 2, wherein the step of processing the security critical activity, with user involvement, further comprises the steps of checking the time period during which the user has not been involved and if the user is not involved within a preset time limit timing out the security device (40) and entering the normal mode and else, continuing the processing of the security critical activity.

4. Method according to claim 2, wherein the step of processing the security critical activity, with user involvement, comprises the steps of letting the user present the identity token in order to prove user presence and if the user is present, continuing the processing of the security critical activity and else, entering the normal mode.

5. Method according to claim 1, wherein the step of processing the security critical activity, with user involvement, further comprises the steps of checking the time period during which the user has not been involved and if the user is not involved within a pre-set time limit timing out the security device (40) and entering the normal mode and else, continuing the processing of the security critical activity.

6. Method according to claim 1, wherein the step of processing the security critical activity, with user involvement, comprises the steps of letting the user present the identity token in order to prove user presence and if the user is present, continuing the processing of the security critical activity and else, entering the normal mode.

7. Method according to claim 1, wherein the step of processing the security critical activity, with user involvement, comprises the steps of requesting that the security critical activity shall be performed with concealed result, presenting the request to the user on an output device, letting the user select or accept recipients of the concealed result through an input device, and if not selected entering the normal mode and else, executing the security critical activity and concealing the result of the execution for delivery to the selected recipients.

8. Method according to claim 1, wherein the step of processing the security critical activity, with user involvement, comprises the steps of proving user presence and if the user is present loading received concealed data into the security device (40), proving the validity of the identities and keys, and if valid decrypting the concealed data and presenting the received data on a suitable output device to the user and else entering the normal mode.

9. Method according to claim 1, wherein the step of processing the security critical activity, with user involvement, comprises the steps of requesting an activity with origin marking, presenting the request to the user on a suitable output device, letting the user grant the request and if granted executing the activity and then origin marking the selected results thereof and else entering the normal mode.

10. Method according to claim 1, wherein the step of processing the security critical activity, with user involvement, comprises the steps of letting the user verify and lock-in at least one intended originator presenting the at least one intended originator to the user checking the signature of the received signed results to confirm the at least one intended originator and if confirmed continue processing and else entering the normal mode.

11. Method according to claim 1, wherein the step of processing the security critical activity, with user involvement, comprises the steps of requesting generation of an irrevocable step, presenting the request together with the arguments of this step, giving the user the option to alter the arguments or enter new arguments, letting the user accept or refuse the request of generation and if accepted continuing the processing including the irrevocable step and if refused entering the normal mode.

12. A security system for data processing a security critical activity, the security critical activity being part of an application running on the security system, comprising:

a processor (14), input/output devices (4, 6, 8, 12), a security device (40), means (28, 30, 32, 34) for transferring the control of the data processing of the application and the control of the input/output devices (4, 6, 8, 12) from the processor (14) to the security device (40), and thereby entering a secure management mode, in which mode the processor (14) is incapable of accessing any of the requested input/output devices (4, 6, 8, 12), means (42, 44) for processing, with user involvement, the security critical activity on the security device (40), the user involvement comprising an act-of-will of the user by means of a user input to the security device proving user presence while the secure management mode prevails, means (42) for transferring the result of the data processing of the security critical activity to the processor (14), the input/output devices (4, 6, 8, 12) or within the security device (40), and means (28, 30, 32, 34) for transferring the control of the input/output devices (4, 6, 8, 12) and the control of the data processing from the security device to the processor (14).

13. Security system according to claim 12, wherein the means for user involvement comprise a processor (42) provided in the security device (40) and a PROM (44) provided in the security device and comprising programmed user involvement steps.

14. Security system according to claim 12, wherein the security device (40) is connected to a screen device controller (10).

15. Security system according to claim 12, comprising two screen device controllers (10) and wherein the processor (14) and the security device (40) each are connected to a separate one of the screen device controllers.

16. Security system according to claim 12, wherein the means for transferring the control of the input/output devices (4, 6, 8, 12) from the processor (14) to the security device (40), and vice versa, are switching and crypto devices (28, 30, 32, 34).

17. Security device according to claim 12, wherein said means (40, 42) for user involvement comprises a processor (42) and a PROM (44), having programmed user involvement steps, which are performed when the device is running a security critical activity.

18. Security device according to claim 17, wherein the system further comprises means for generating switching signals to be applied to switching and crypto devices (28, 30, 32, 34).

19. Security device according to claim 18, wherein the means for generating switching signals comprise a processor

(42) and a PROM (44), which is provided with programmed switch generation steps.

20. Method for data processing a security critical activity in a secure management mode, the security critical activity being part of an application running on a system comprising a processor (14), input/output devices (4, 6, 8, 12) and a security device (40), said processing method comprising the following steps:

allocating the security device (40) in response to a call from the processor (14) or any of the input/output devices (4, 6, 8, 12), when in a normal mode, transferring the control of the data processing of the application and the control of requested input/output devices (4, 6, 8, 12) from the processor (14) to the security device (40) and thereby entering the secure management mode, in which mode the processor (14) is incapable of accessing any of the requested input/output devices (4, 6, 8, 12), processing, with user involvement, the security critical activity on the security device (40), transferring the result of the data processing of the security critical activity to the processor (14), the input/output devices (4, 6, 8, 12) or within the security device (40), and transferring the control of the input/output devices (4, 6, 8, 12) and the control of the data processing from the security device (40) to the processor (14) and thereby entering the normal mode, wherein the step of processing the security critical activity, with user involvement, comprises the steps of:
requesting generation of an irrevocable step,
presenting the request together with the arguments of this step,
giving the user the option to alter the arguments or enter new arguments,
letting the user accept or refuse the request of generation and if accepted
continuing the processing including the irrevocable step and if refused
entering the normal mode.

* * * * *

UNITED STATES PATENT AND TRADEMARK OFFICE
CERTIFICATE OF CORRECTION

PATENT NO. : 6,618,809 B1
DATED : September 9, 2003
INVENTOR(S) : Christian Wettergren It is certified that error appears in the above-identified patent and that said Letters Patent is hereby corrected as shown below:

<u>Title page,</u>
Item [22], should read as follows:

-- [22]  PCT Filed:  Oct. 30, 1997 --.

Signed and Sealed this

Sixteenth Day of December, 2003

JAMES E. ROGAN
*Director of the United States Patent and Trademark Office*